United States Patent [19]

Den Hartog

[11] 4,446,112

[45] May 1, 1984

[54] APPARATUS FOR CONTACTING FLUID WITH PARTICULATE SOLID MATERIAL

[75] Inventor: Arie P. Den Hartog, The Hague, Netherlands

[73] Assignee: Shell Oil Company, Houston, Tex.

[21] Appl. No.: 380,587

[22] Filed: May 21, 1982

[30] Foreign Application Priority Data

Jul. 22, 1981 [GB] United Kingdom ................ 8122652

[51] Int. Cl.³ .......................... B01J 8/12; C10G 35/12
[52] U.S. Cl. .................................... 422/216; 134/104; 208/169; 422/191; 422/195; 422/219; 422/220
[58] Field of Search ............... 422/212, 213, 219, 216, 422/140, 145, 147, 195, 191, 220, 236, 239; 210/189; 208/173, 169; 134/104, 110, 111

[56] References Cited

U.S. PATENT DOCUMENTS

| | | | |
|---|---|---|---|
| 3,883,312 | 5/1975 | Youngman | 422/212 |
| 3,966,420 | 6/1976 | Pegels et al. | 422/191 |
| 4,104,149 | 8/1978 | Veinerman et al. | 208/169 X |

Primary Examiner—Barry S. Richman
Assistant Examiner—William R. Johnson

[57] ABSTRACT

An apparatus for contacting fluid with particulate solid material provided with a contact space and a separating section arranged at an angle with respect to the horizontal for the discharge of fluid from the contact space into a fluid collecting space. To avoid pinning of solid material against the separating section means are provided for inducing a pressure gradient with the pressure decreasing in downward direction along the separating section during operation of the apparatus.

13 Claims, 8 Drawing Figures

APPARATUS FOR CONTACTING FLUID WITH PARTICULATE SOLID MATERIAL

BACKGROUND OF THE INVENTION

The invention relates to an apparatus for contacting fluid with particulate solid material. This type of apparatus is used for the catalytic treatment of fluids, such as the catalytic desulphurization and demetallization of petroleum residues.

The invention relates in particular to an apparatus for contacting fluid with particulate solid material comprising a vertically extending vessel having inlet means for fluid and particulate solid material at the upper part of the vessel, said inlet means communicating with a contact space within the vessel, the lower part of the boundary of the contact space comprising a separating section being permeable to fluid and impermeable to particulate solid material to permit fluid to flow from the contact space into a fluid collecting space, the separating section being arranged at an angle with respect to the horizontal, and separate outlet means for fluid and particulate solid material arranged downstream of the separating action.

The term fluid in the specification and claims is used to include a gas/liquid mixture.

In the above-mentioned type of contacting apparatus, the particulate solid material forms a bed in the vessel, which bed moves in downward direction by way of gravity flow. Aged solid particles are discharged from the lower part of the vessel while fresh solid particles are supplied into the upper part of the vessel. The fluid flowing through the bed of particulate solid material exerts driving forces on the solid particles of the bed in the direction of the fluid flow. The fluid flowing towards the separating section thereby pushes the solid material against the screen forming the separating section. At high fluid velocities the solid material can be easily pushed against the screen with such a high force that the friction between the particulate solid material and the screen surface cannot be overcome, so that a stagnant zone in which the particulate solid material no longer moves is formed adjacent to the screen. The phenomenon of the formation of such a stagnant zone is also called "pinning". Since in such a stagnant zone the solid material is not regularly refreshed, the part of the bed of particulate solid material in such a zone may easily be plugged with contaminations such as dirt, coke, metals and salts, from the fluid flowing through the bed of particulate solid material. A further consequence of the formation of a stagnant zone adjacent to a screen in a contacting apparatus may consist herein that due to contaminations the permeability of the stagnant zone is so reduced that the fluid in the vessel can no longer be discharged from the bed of particulate solid material. In this case the fluid treatment in the contacting apparatus must be stopped in order to clean and refresh the plugged zones, which is a time-consuming and therefore cost-consuming operation.

Nowadays there is a tendency to operate apparatus for contacting fluid with particulate solid material at ever increasing fluid flow velocities to obtain higher throughputs. This tendency is associated with a growing risk of the formation of a stagnant zone, in the bed of particulate solid material adjacent to a separating section in the contacting apparatus.

SUMMARY OF THE INVENTION

The object of the present invention is to provide an apparatus for contacting fluid with particulate solid material wherein even at increasing fluid flow velocities the risk of the formation of a stagnant zone adjacent to a separating section is reduced. The apparatus according to the invention comprises a vertically extending vessel having inlet means for fluid and particulate solid material at the upper part of the vessel. The inlet means communicates with a contact space within the vessel, the lower part of the boundary of the contact space comprising a separating section being permeable to fluid and impermeable to particulate solid material to permit fluid to flow from the contact space into a fluid collecting space. The separating section is arranged at an angle with respect to the horizontal, and separate outlet means for fluid and particulate solid material, arranged downstream of the separating section. Means are provided for inducing a pressure gradient with the pressure decreasing in downward direction, along the separating section during operation of the apparatus.

With the said arrangement of pressure gradient inducing means the fluid will obliquely pass through the separating section, instead of perpendicularly passing through the separating section as in the known contacting apparatus. As a result thereof the force pushing the solid material along the separating section is increased with respect to the force pushing the solid material against the separating section. This higher pushing force means a considerable reduction of the risk of the formation of above-mentioned stagnant zones.

BRIEF DESCRIPTION OF THE DRAWINGS

The invention will now be described by way of example in more detail with reference to the drawings, wherein.

DESCRIPTION OF A PREFERRED EMBODIMENT

Figure 1:
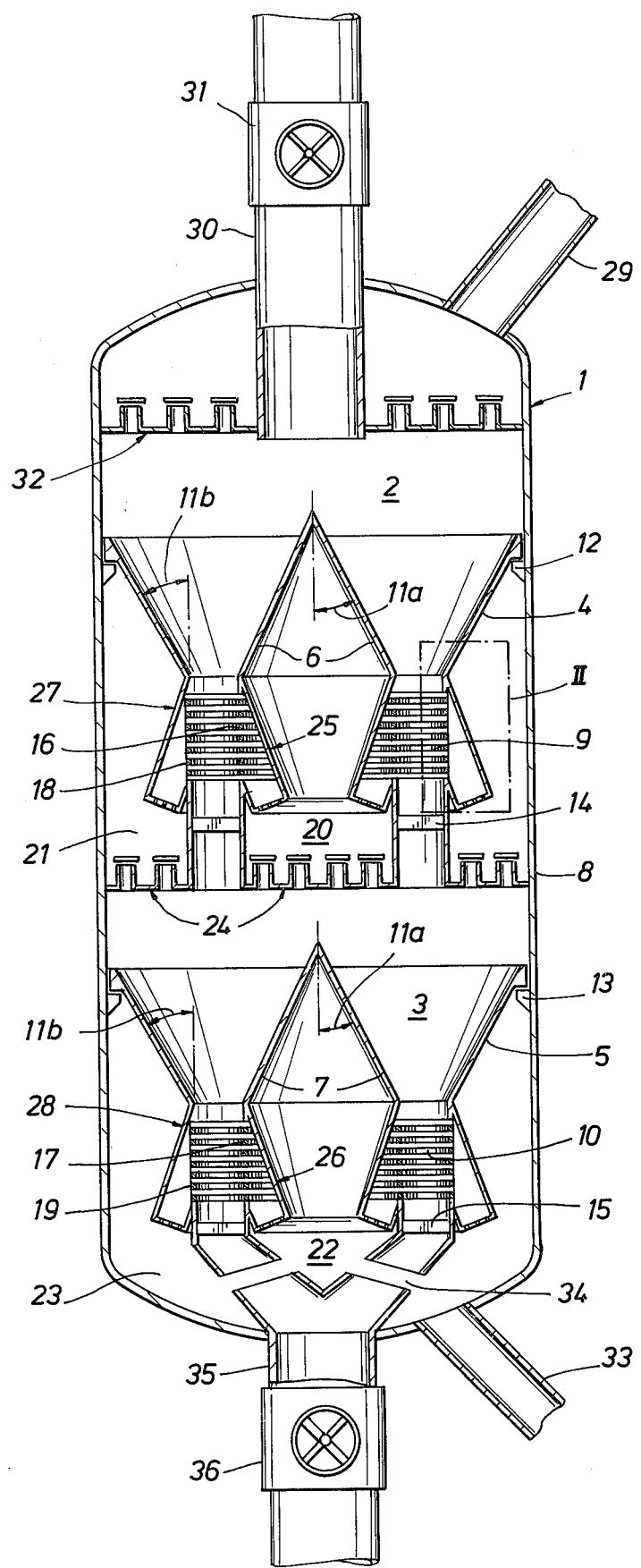
FIG. 1 schematically shows a vertical cross section of an apparatus for contacting fluid with particulate solid material according to the invention.

Referring to FIG. 1, a vessel 1 of an apparatus for contacting fluid with particulate solid material comprises two contact spaces 2 and 3. The contact spaces 2 and 3 are partly bounded by outer, downwardly converging conical surfaces 4 and 5, respectively, and inner, downwardly diverging conical surfaces 6 and 7, respectively. Each pair of conical surfaces 4 and 6, and 5 and 7 serves to support a bed of particulate solid material and to guide said solid material in downward direction. The spaces 2 and 3 are further bounded by parts of side wall 8 of the vessel 1 and by the walls of annular channels 9 and 10, respectively, arranged at the lower ends of the conical surfaces 4 and 6, and 5 and 7, respectively. In this example the angles 11a with the vertical axis of the inner conical surfaces 6 and 7 are about 20 degrees and the angles 11b with the vertical axis of the outer conical surfaces 4 and 5 are about 30 degrees. The outer, conical surfaces 4 and 5 are carried and supported by cone supports 12 and 13, respectively, and the inner conical surfaces 6 and 7 by insert supports 14 and 15, respectively. The walls of the annular channels 9 and 10 are provided with separating sections formed by inner cylindrical screens 16 and 17, respectively, and outer cylindrical screens 18 and 19, respectively. Said screens are permeable to fluid and impermeable to particulate solid material to permit the flow of fluid from the spaces 2 and 3 into fluid-collecting spaces 20, 21 and 22, 23, respectively. The fluid passed through the screens 16 and 18 is received by a fluid-permeable distributor tray 24 arranged partly in fluid-collecting space 20 and partly in fluid-collecting space 21. The fluid-collecting spaces 20 and 21 may be provided with known means (not shown) for cooling the fluid passed through the screens 16 and 18. The screens 16 through 19 are each provided with means 25, 26, 27 and 28, respectively, each being arranged behind the relevant screen, for inducing a pressure gradient along the relevant screen with the pressure decreasing in downward direction during operation of the apparatus. By this arrangement of the means 25 through 28 pinning of solid material against the screens is prevented as will be explained in detail with reference to FIGS. 2 and 3. In the shown embodiment of the invention the means 25, 26, 27 and 28 are identically shaped. Hereinafter these means 25, 26, 27 and 28 will be indicated by the expression anti-pinning means.

The vessel 1 is further provided with an inlet 29 for fluid and an inlet 30 provided with a rotary valve 31 for the supply of particulate solid material. For distributing the fluid uniformly over the interior of the vessel 1 a distributor tray 32 is arranged in the upper part of the vessel 1. The fluid is discharged from the interior of the vessel 1 via an outlet 33 arranged downstream of the screens 17 and 19 and being in communication with the fluid-collecting space 23 arranged behind the outer screen 19. The collecting space 22 arranged behind the inner screen 17, is in fluid communication with the collecting space 23 via a number of fluid passages 34. For removing the particulate solid material from the vessel 1 an outlet pipe 35 provided with a rotary valve 36 passes through an opening in the bottom part of the vessel 1.

In order to load the vessel 1 with particulate solid material, rotation of the rotary valve 36 is stopped and the vessel is filled with a carrier liquid supplied via the fluid inlet 29. Solid particles are introduced into the vessel 1 via the inlet 30 by rotating the valve 31. The carrier liquid is replaced by the solid particles and removed from the vessel 1 via the fluid outlet 33. The introduced particulate solid material forms a bed in the contact space 2 on the upper conical surfaces 4 and 6 as well as in the contact space 3 on the lower conical surfaces 5 and 7.

Figure 3:
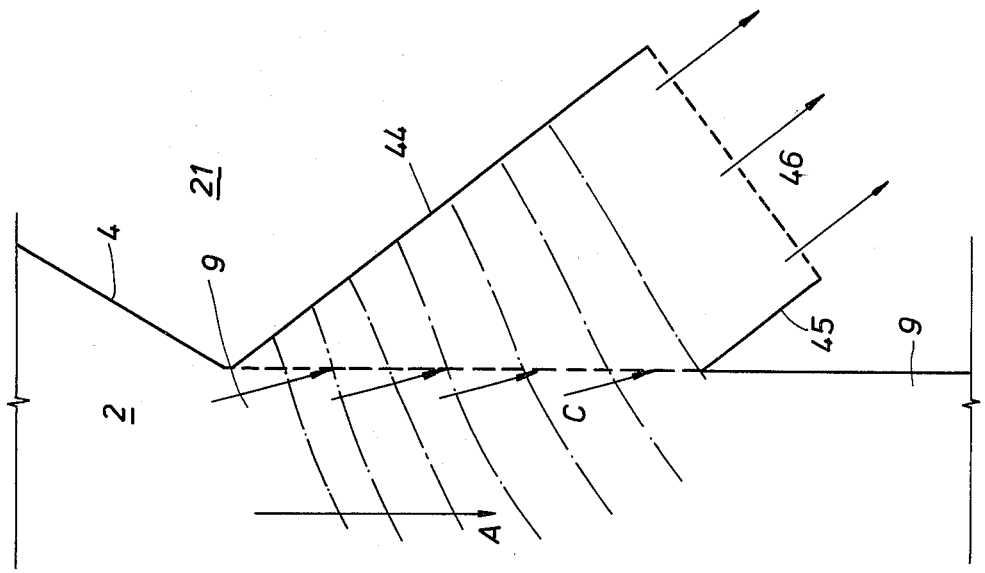
FIG. 3 shows the flow pattern adjacent to the screen section shown in FIG. 2.

After loading the vessel 1 with particulate solid material, a fluid, for example a liquid, to be treated is introduced into the vessel 1 via the fluid inlet 29 and distributed over the contact space 2 via the openings in the distributor tray 32. The type of solid particles is so chosen that contaminations in the fluid stream passing through the vessel 1 are absorbed by the beds of particulate solid material in the contact spaces 2 and 3. Upon flowing through the bed of particulate solid material in the contact space 2 part of the contaminations is removed from the fluid stream. When reaching the annular channel 9 the treated fluid will leave the contact space 2 via the openings in the inner screen 16 and the outer screen 18 and will enter into the fluid-collecting spaces 20 and 21 behind said screens 16 and 18, respectively. In these fluid-collecting spaces 20 and 21 the fluid is, for example, cooled and/or homogenized prior to further treatment thereof. Via the openings in the distributor tray 24 the fluid is subsequently supplied to the lower contact space 3. After having passed the bed of solid particles in this space 3, wherein the remaining part of the contaminations is removed from the fluid stream, the treated fluid is discharged from the contact space 3 via the openings in the inner screen 17 and the outer screen 19 and finally withdrawn from the interior of the vessel 1 via the fluid outlet 33. When contamination and deactivation of the beds of solid material necessitate replacement of the solid particles, rotary valve 36 is rotated as a result of which the mass of solid particles in the vessel 1 is no longer supported from underneath, and flows out of the vessel 1, whereafter the rotation of the rotary valve 36 is stopped. Fresh solid particles are preferably simultaneously supplied into the vessel 1 via inlet 30 by rotating the rotary valve 31. During the replacement of the solid material the fluid-treating process in the vessel may be continued. It will be understood that the solid material can also continuously be refreshed during the fluid treatment. In this case valves 31 and 36 are permanently or periodically rotated so that a continuous or intermittent flow of fresh solid material is supplied via the inlet 30. During operation of the vessel 1 plugging of the beds of solid material by pinning of solid material to the screens 16 through 19 is prevented by the arrangement of the anti-pinning means 25 through 28. A further explanation of these means will now be given with reference to FIGS. 2 and 3, showing part of the annular channel 9 with the outer screen 18 and the anti-pinning means 27.

Figure 2:
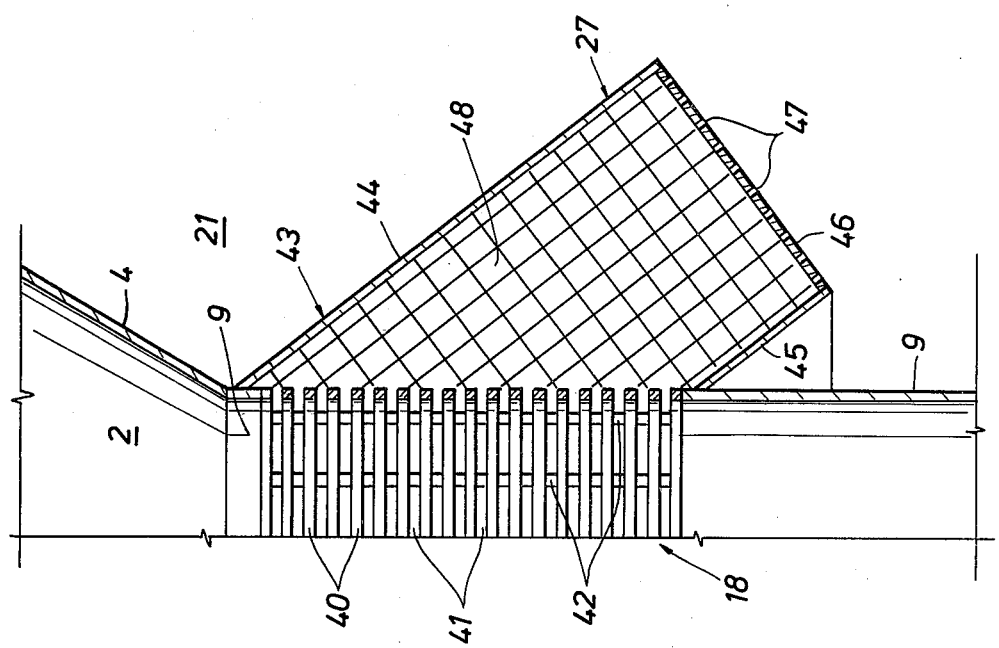
FIG. 2 shows detail II of FIG. 1 on a larger scale.

As shown in FIG. 2 the outer screen 18 is composed of a plurality of horizontal circular bars 40 arranged at a distance from each other to form a plurality of horizontal slits 41, and is reinforced by a plurality of vertical reinforcing bars 42. The anti-pinning means 27 comprises a box-like structure 43 arranged in the fluid-collecting space 21 and enclosing the outer screen 18. The box-like structure 43 comprises two substantially parallel fluid-tight walls 44 and 45, attached to the annular channel 9 and being inclined with respect to the outer screen 18. A lower perforated wall 46 being arranged at an angle with respect to the outer screen 18 extends between the fluid-tight wall 44 and the fluid-tight wall 45. The perforations in the lower wall 46 have been indicated by reference numeral 47. The interior of the box-like structure 43 is provided with flow resistance means in the form of a permeable mass 48, such as a mass of spherical solid particles. The fluid flow pattern in the channel 9 adjacent to the screen 18 during operation of the vessel 1, is shown in FIG. 3. For the sake of clarity the components shown in FIG. 2 are only schematically indicated in FIG. 3. The intermittent or continuous flow of the particulate solid material through the channel 9 has been indicated by arrow A. In the fluid-collecting space 21 outside the box-like structure 43 a substantially uniform fluid pressure prevails, which is maintained at a lower level than the fluid pressure in the channel 9 to obtain a fluid flow from the channel 9 into the fluid-collecting space 21. Fluid treated by the particulate solid material in the contact space 2 leaves the channel 9 partly via the horizontal slits 41 in the outer screen 18. When the screen 18 is not provided with anti-pinning means 27 the fluid flow upon passing through the slits 41 will be perpendicular to the screen 18. The force induced by the fluid flow will push the solid material against the screen 18, thereby hampering or even preventing downward movement of the solid material through the channel 9. The arrangement of the box-like structure 43 with the permeable mass 48 has the following effect on the fluid flow adjacent to the screen 18. Since the pressure in the fluid-collecting space 21 outside the box-like structure 43 is substantially uniform, the direction of the flow of fluid upon passing through the perforations 47 in the wall 46 of the box-like structure 43 will be perpendicular to said wall 46. This fluid flow has been indicated by arrows B. Due to the presence of the permeable mass 48, shown in FIG. 2, in the box-like structure 43 the fluid pressure prevailing in the upper part of the box-like structure 43 will be substantially higher than the fluid pressure in the lower part of said structure 43 near the lower perforated wall 46. The planes of constant pressure, also called iso-baric planes, occurring in the box-like structure 43 during the flow of fluid therethrough have been indicated by chain-dotted lines. In accordance with the potential flow theory the fluid flow lines are in all locations perpendicular to said iso-baric planes. Due to the inclination of the perforated wall 46 and the presence of the permeable mass 48 the iso-baric planes are inclined with respect to the screen 18, so that the fluid will obliquely pass the screen 18 as indicated by arrows C in FIG. 3. The rate of obliqueness of the fluid flow lines C largely depends on the inclination of the perforated wall 46 and the permeability of the permeable mass 48 compared with the permeability of the bed of particulate solid material in the annular channel 9. An increase of the permeability of the permeable mass 48 and/or a decrease of the inclination of the wall 46 results in a decrease of the acute angles between the screen 18 and the fluid flow lines C. The vertical components of the forces induced by the fluid flows promote the downward movement of the particulate solid material in the channel 9 along the screen 18. A further consequence of the inclination of the fluid flow lines C with respect to the screen 18 consists herein that at a given fluid flow velocity adjacent to the screen 18, the fluid flow-induced force on the particulate solid material in the direction of the screen 18 is reduced compared with the fluid flow-induced force adjacent to a screen not being provided with anti-pinning means.

The above mentioned arrangement of the box-like structure 43 with the permeable mass 48 allows an increase of the fluid flow velocity without the risk of the formation of a stagnant zone of solid material adjacent to the screen 18. By reducing the acute angles between the fluid flows and the screen 18, the fluid flow-induced downward force is increased. A reduction of said angles can be obtained by reducing the inclination of the perforated wall 46 with respect to the horizontal. To obtain a smooth flow pattern adjacent to the screen 18, the perforated wall 46 is preferably perpendicularly arranged with respect to the fluid-tight walls 44 and 45. Varying the inclination of the perforated wall 46 should therefore be preferably attended with a variation in the inclination of the fluid-tight walls 44 and 45.

Figure 5:
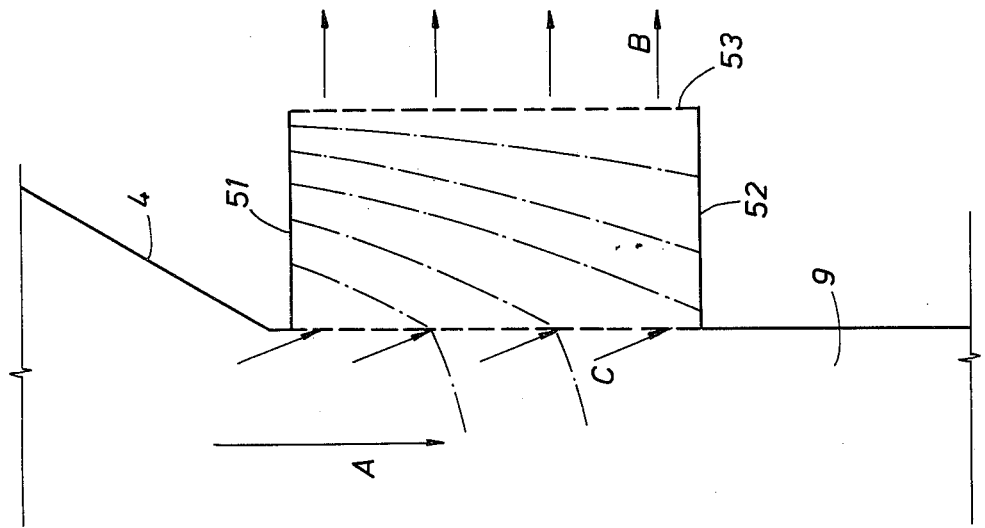
FIG. 5 shows the flow pattern adjacent to the screen section shown in FIG. 4.
Figure 4:
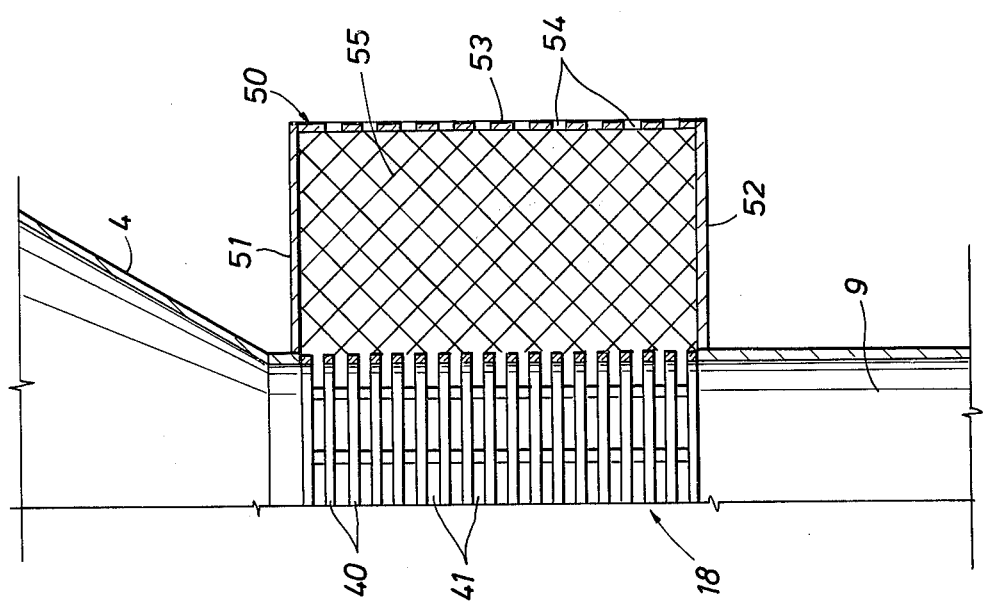
FIG. 4 shows a first alternative of the pressure gradient inducing means shown in FIG. 2.

Reference is now made to FIGS. 4 and 5, showing a first alternative with flow scheme of the pressure gradient inducing means shown in FIG. 2. In this first alternative embodiment of the invention the screen 18 is provided with a box-like structure 50 enclosing said screen and being arranged in the fluid-collecting space 21. This box-like structure 50 has a top wall 51, a bottom wall 52, and a side wall 53 provided with perforations 54. The interior of the box-like structure 50 is provided with flow resistance means in the form of a permeable mass 55 wherein the degree of permeability increases in downward direction along the screen 18. The permeable mass 55 is for example composed of solid granular particles having sizes increasing in downward direction. The size of the perforations 54 in the side wall 53 is so chosen that the particles of the mass 55 cannot pass through said perforations 54. FIG. 5 shows the flow scheme when fluid leaves the channel 9 through the openings in the screen 18 and the box-like structure 50. Due to the downwardly decreasing resistance of the permeable mass 55, the fluid pressure in the box-like structure 50 adjacent to the screen 18 is relatively high near the upper end thereof and decreases in downward direction. The iso-baric planes occurring in the box-like structure 50 during the flow of fluid therethrough have been indicated in FIG. 5 by chaindotted lines. The inclination of said iso-baric planes depends on the variation of the permeability of the permeable mass 55 over the height of the box-like structure 50. The fluid flowing perpendicular to said iso-baric planes will pass through the screen 18 according to the fluid flow lines indicated by the arrows C. The fluid flow lines of the fluid upon passing through the perforations 54 in the side wall 53 of the box-like structure 50 have been indicated by the arrows B. Arrow A indicates the direction of the gravity flow of the particulate solid material in the annular channel 9. By varying the degree of the permeability of the permeable mass 55 over the height of the box-like structure 50, the inclination of the fluid flows indicated by the arrows C, is varied. At a desired fluid velocity through the openings of the screen 18 the variation of the degree of the permeability of the permeable mass 55 over the height of the box-like structure 50, is so chosen that the total downward force, i.e. the gravity force and the vertical component of the fluid flow-induced force on the particulate solid material in the channel 9 exceeds the friction between the solid particles and the screen 18, occurring due to the horizontal component of the fluid flow-induced force.

Figure 6:
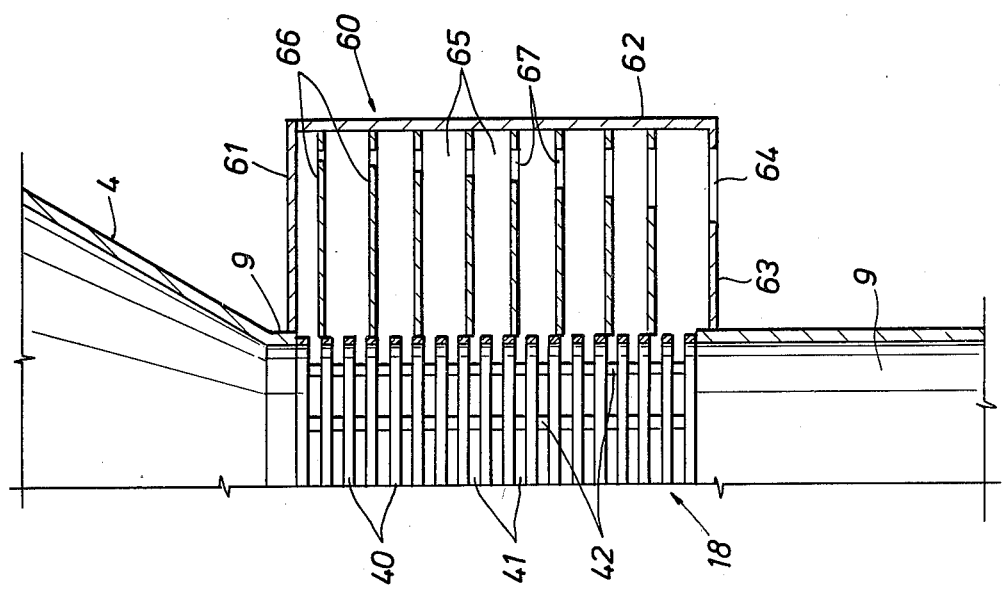
FIG. 6 shows a second alternative of the pressure gradient inducing means shown in FIG. 2.

Reference is now made to FIG. 6 showing a cross-section of a second alternative of the screen arrangement with anti-pinning means shown in detail in FIG. 2. The anti-pinning means shown in FIG. 6 comprises a box-like structure 60 arranged in the fluid-collecting space 21 and enclosing the screen 18. Said box-like structure 60 consists of a closed top wall 61, a closed side wall 62 and a bottom wall 63 provided with openings 64. The interior of the box-like structure 60 is subdivided in downward direction into a plurality of compartments 65 by walls 66. Each wall 66 is provided with openings 67 for the passage of fluid, said openings forming flow resistance means. The walls 66 may be secured to the vertical reinforcing bars 42 of the screen 18 by means of welding. The total cross-sectional area of the openings 67 in the walls 66 increases in downward direction.

The cross-sectional areas of the openings 67 and the openings 64 are so chosen that due to the flow of fluid through the box-like structure 60 the fluid pressures in the various compartments decreases in a downward direction. The fluid in the annular channel 9 arriving at the screen 18, tends to reach locations of lower pressures. Due to the differences of the fluid pressures in the compartments 65 the fluid will obliquely pass through the horizontal slits 41 in the screen 18. The inclination of the fluid flows depends on the differences between the pressures prevailing in the compartments 65. The pressure differences themselves depend on the total cross-sectional area of the openings 67 and 64, being so chosen that the inclination of the fluid flows is such that the total downward force on the solid material in the channel 9 exceeds the friction between the solid material and the screen 18, induced by the fluid flows.

Figure 7:
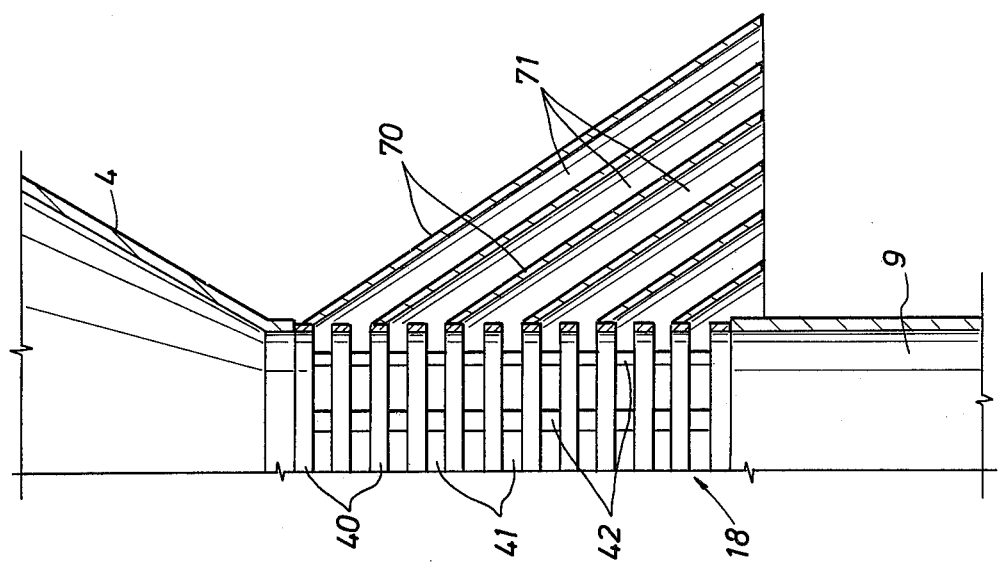
FIG. 7 shows a third alternative of the pressure gradient inducing means shown in FIG. 2.

In FIG. 7 a further embodiment of the invention is shown. In this embodiment the pressure gradient inducing means comprises a plurality of walls 70 arranged at some distance from each other so that fluid passages 71 form flow resistance means. The walls 70 may be secured to the vertical reinforcing bars 42 of the screen 18 by means of welding. The walls 70 are so arranged relative to each other that the length of the fluid passages 71 decreases and/or the width thereof increases in downward direction. The resistances induced by said passages 71 during the flow of fluid therethrough decrease in a downward direction along the screen 18. As a consequence thereof the fluid pressure prevailing during operation of the apparatus near the upper end of the screen 18 is relatively high, and the fluid pressure near the lower end of the screen 18 is relatively low. By the arrangement of the fluid passages 71 the fluid in the annular channel 9 will therefore obliquely pass the screen 18. The inclination of the fluid flows passing through the screen 18 depends on the variation of the lengths and the variation of the widths of the fluid passages 71. These lengths and/or widths of the fluid passages 71 are so chosen that at a given fluid flow velocity the inclination of the fluid flows passing through the screen 18 has such a value that the total downward force on the solid material in the channel 9 exceeds the fluid flow-induced friction between said solid material and the screen 18.

Figure 8:
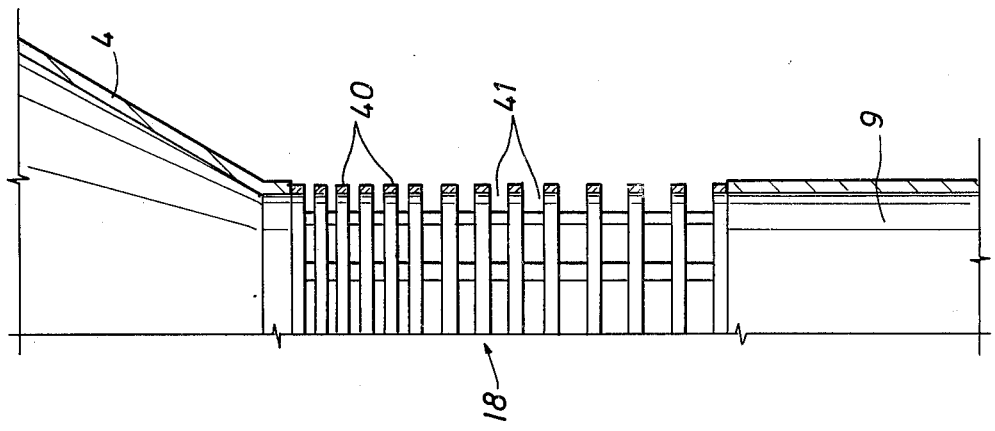
FIG. 8 shows a fourth alternative of the pressure gradient inducing means shown in FIG. 2.

In FIG. 8, showing a fourth alternative of the arrangement shown in detail in FIG. 2, the pressure gradient inducing means are incorporated in the screen 18 itself. The horizontal bars 40 are so arranged relative to each other that the width of the horizontal slits 41 increases in downward direction so that the horizontal slits 41 near the upper end of the vessel form relatively high flow resistances and the horizontal slits 41 near the lower end of the screen 18 form relatively small flow resistances. With the above arrangement of the screen 18, fluid will leave the channel 9 at an acute angle with respect to the surface of the screen 18, thereby reducing the risk of pinning of solid material in the channel 9 to the openings of the screen 18, as explained hereinbefore with reference to the preceding FIGS. 2 through 7.

It is noted that the invention is not restricted to screens having a circular shape as shown in FIG. 1.

Instead thereof the screen may be, for example, frustoconically shaped, by applying the screen in the conical surfaces forming part of the boundary of a contact space in an apparatus for contacting fluid with particulate solid material.

Further, the screen does not need to be provided with horizontal slits for passing fluid. Any other type of openings can be applied without departing from the invention.

It is further noted that the permeable masses 48, 55 can be formed of, for example, fibers woven to form a permeable network instead of solid granular particles.

It will be understood that the invention is not restricted to the embodiments described above by way of example. In this connection it should be noted that various combinations of the design features of the embodiments shown in the Figures may be used, e.g. by providing the box-like structure 43 shown in FIG. 2 with perforated walls 65 to form compartments in downstream direction shown in FIG. 6 instead of the permeable mass 48.

What is claimed is:

1. An apparatus for contacting a fluid with a particulate solid comprising:
   a vertical vessel having separate inlets for the fluid and solid particles disposed in the upper part of the vessel, both of said inlets communicating with a means defining a contact space located in the upper section of the vessel;
   a means defining a separation section disposed in said vessel below said contact space, said separation section comprising inner and outer cylindrical walls mounted in said vessel to form an annular channel, said contact space being connected to said annular channel by means of downwardly sloping conical surfaces;
   a continuous cylindrical screen mounted in a portion of each cylindrical wall, said screen being formed by a plurality of circular rods spaced vertically to allow fluid passage and prevent passage of solid particles;
   a means defining a fluid collecting space in the interior of said inner cylindrical wall and in the exterior of said outer cylindrical wall, said fluid collecting space communicating with said cylindrical screens; and
   means positioned in said fluid collecting space for producing a pressure gradient along the separation section during operation of the apparatus so that said pressure along said separation section decreases in a downward direction.

2. The apparatus of claim 1 wherein said means for producing a pressure gradient comprises a box-like structure positioned behind said cylindrical screens, said box-like structure having flow restricting means therein, said flow restricting means having decreasing restriction in a downward direction.

3. The apparatus of claim 2 wherein said flow restricting means is a permeable mass.

4. The apparatus of claim 3 wherein each of said box-like structures comprises an upper wall that is fastened at one edge to the walls of said annular channel and extend downwardly, and a lower wall that is fastened at one edge to the walls of said annular channel and extend downwardly, a bottom wall fastened to the lower edges of said upper and lower walls to enclose said box-like structure, said bottom wall having openings for the passage of fluid from said box-like structure to said fluid collecting space.

5. An apparatus for contacting a fluid with a particulate solid comprising:
   a vertical vessel having separate inlet means for the fluid and solid particles disposed in the upper portion of the vessel, both of said inlet means communicating with a means defining contact space in said vessel;

inner and outer cylindrical walls positioned inside said vessel to form an annular channel, said annular channel communicating with said contact space at its upper end;

a means defining a separation section disposed in the inner and outer walls of said annular channel, said separation section being permeable to fluid flow and impermeable to particle flow;

a means defining fluid collecting space, said fluid collecting space communicating with said separation section and having a separate outlet;

a separate outlet for said particles disposed downstream of said separation section; and an anti-pinning means for producing a pressure gradient along the separation section during operation of the apparatus said anti-pinning means comprising a box-like structure mounted within said inner cylindrical wall and outside said outer cylindrical wall, said structure having flow restricting means therein, said flow restricting means having decreasing restriction in a downward direction, thereby causing said pressure along said separation section to decrease in a downward direction.

6. The apparatus of claim 5 wherein said box-like structure has side walls that are positioned at an angle to the inner and outer cylindrical walls and a lower wall positioned at an angle to the side walls, said lower wall having openings for the passage of fluid.

7. The apparatus of claim 5 wherein said box-like structure has a plurality of walls that subdivide said box-like structure into a plurality of compartments, each wall having at least one opening for the passage of fluid, the cross-sectional area of said openings increasing in a downward direction.

8. The apparatus of claim 5 wherein said separation section comprises a screen disposed to permit passage of fluid to said fluid collecting space and prevent passage of said particulate solid.

9. The apparatus of claim 8 wherein said screen comprises horizontal bars, the openings between said bars increasing in a downward direction to produce a pressure gradient, said pressure decreasing in a downward direction.

10. The apparatus of claim 5 wherein said box-like structure is formed by top and bottom walls disposed perpendicular to said separation section, a side wall enclosing said box-like structure, said side wall having openings for the passage of fluid, said box-like structure including a flow resistance means comprising a permeable mass having increasing permeability in a downward direction.

11. The apparatus of claim 5 wherein said flow restricting means is a permeable mass.

12. The apparatus of claim 11 wherein the permeability of said mass increases in a downward direction.

13. The apparatus of claims 11, 12, or 10 wherein said permeable mass comprises solid particles.

* * * * *